United States Patent
Zhong et al.

(10) Patent No.: US 12,414,016 B2
(45) Date of Patent: Sep. 9, 2025

(54) MOBILITY MANAGEMENT METHOD, SOURCE BASE STATION, TARGET BASE STATION, AND TERMINAL DEVICE

(71) Applicant: VIVO MOBILE COMMUNICATION CO., LTD., Dongguan (CN)

(72) Inventors: Tingting Zhong, Dongguan (CN); Zhenhua Xie, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 379 days.

(21) Appl. No.: 17/944,674

(22) Filed: Sep. 14, 2022

(65) Prior Publication Data

US 2023/0018193 A1 Jan. 19, 2023

Related U.S. Application Data

(63) Continuation of application No. PCT/CN2021/084936, filed on Apr. 1, 2021.

(30) Foreign Application Priority Data

Apr. 3, 2020 (CN) .......................... 202010260827.1

(51) Int. Cl.
*H04W 36/00* (2009.01)
*H04W 36/24* (2009.01)

(52) U.S. Cl.
CPC ...... *H04W 36/0007* (2018.08); *H04W 36/249* (2023.05)

(58) Field of Classification Search
CPC ............. H04W 36/00; H04W 36/0007; H04W 36/249; H04W 4/06
See application file for complete search history.

(56) References Cited

U.S. PATENT DOCUMENTS

2004/0266440 A1* 12/2004 Fuchs ................ H04L 12/1836
455/445
2006/0154627 A1 7/2006 Wang et al.
(Continued)

FOREIGN PATENT DOCUMENTS

CN 101237393 A 8/2008
CN 101242573 A 8/2008
(Continued)

OTHER PUBLICATIONS

5G X Cast, Broadcast and Multicast Communication Enablers for the Fifth-Generation of Wireless Systems, Deliverable D4.3, Session Control and Management, Nov. 14, 2018.
(Continued)

*Primary Examiner* — Kenny S Lin
(74) *Attorney, Agent, or Firm* — Price Heneveld LLP

(57) ABSTRACT

The present disclosure provides a mobility management method, a source base station, a target base station, and a terminal device. The method includes: receiving a report message from a terminal device, where the terminal device is a terminal device that receives data of a first multicast service, and the report message includes a measurement result; and transmitting a handover command to the terminal device, where the handover command is used to instruct the terminal device to switch to a target base station, and the target base station is determined based on the measurement result.

15 Claims, 9 Drawing Sheets

(56) References Cited

U.S. PATENT DOCUMENTS

| | | | |
|---|---|---|---|
| 2013/0034013 A1 | 2/2013 | Jung et al. | |
| 2014/0050138 A1 | 2/2014 | Wang et al. | |
| 2016/0105838 A1* | 4/2016 | Wang | H04W 40/04 370/329 |
| 2016/0205578 A1* | 7/2016 | Lee | H04W 36/00695 455/442 |
| 2018/0035339 A1* | 2/2018 | Mitsui | H04W 72/04 |
| 2018/0160342 A1* | 6/2018 | Park | H04W 36/0007 |
| 2018/0255496 A1* | 9/2018 | Kim | H04W 36/00837 |
| 2018/0376384 A1* | 12/2018 | Youn | H04W 36/144 |
| 2019/0174271 A1* | 6/2019 | Fujishiro | H04W 88/184 |
| 2019/0281523 A1* | 9/2019 | Lee | H04W 36/0007 |
| 2022/0408317 A1* | 12/2022 | Zhao | H04W 36/0007 |
| 2023/0199569 A1 | 6/2023 | Cao et al. | |

FOREIGN PATENT DOCUMENTS

| | | |
|---|---|---|
| CN | 104303550 A | 1/2015 |
| CN | 105530667 A | 4/2016 |
| CN | 107231619 A | 10/2017 |
| CN | 111866975 A | 10/2020 |
| EP | 4099760 A1 | 12/2022 |
| WO | 2013/055087 A1 | 4/2013 |
| WO | 2015065022 A1 | 5/2015 |
| WO | 2017095434 A1 | 6/2017 |
| WO | 2022017190 A1 | 1/2022 |

OTHER PUBLICATIONS

Tencent, KI #7, Sol #29: Update to clarify MBS switching procedures, SA WG2 Meeting #141 E (e-meeting), S2-2007198, Oct. 12-Oct. 23, 2020, Elbonia.

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 3GPP TS 36.300 V15.8.0, Dec. 2019.

3GPP, 3rd Generation Partnership Project; Technical Specification Group Radio Access Network; Evolved Universal Terrestrial Radio Access Network (E-UTRAN); X2 application protocol (X2AP) (Release 15), 3GPP TS 36.423 V15.8.0, Dec. 2019.

Huawei, SC-PTM service continuity, 3GPP TSG-RAN WG3 #89, R3-151388, Aug. 24-28, 2015, Beijing, P.R. China.

China National Intellectual Property Administration, International Search Report issued in corresponding Application No. PCT/CN2021/084936, mailed Jul. 7, 2021.

The State Intellectual Property Office of People's Republic of China, First Office Action issued in corresponding Application No. 202010260827.1.

The State Intellectual Property Office of People's Republic of China, First Search issued in corresponding Application No. 202010260827.1 (translation not available).

* cited by examiner

MOBILITY MANAGEMENT METHOD, SOURCE BASE STATION, TARGET BASE STATION, AND TERMINAL DEVICE

CROSS-REFERENCE TO RELATED APPLICATIONS

This application is a continuation of International Application No. PCT/CN2021/084936 filed on Apr. 1, 2021, which claims priority to Chinese Patent Application No. 202010260827.1, filed in China on Apr. 3, 2020, which are incorporated herein by reference in their entirety.

TECHNICAL FIELD

The present disclosure relates to the field of communication technologies, and in particular, to a mobility management method, a source base station, a target base station, and a terminal device.

BACKGROUND

Multimedia broadcast and multicast services (Multimedia Broadcast and Multicast Service, MBMS) in long term evolution (Long Term Evolution, LTE) supports broadcast or multicast transmission in both an MBMS single frequency network (Multimedia Broadcast multicast service Single Frequency Network, MBSFN) mode and a single cell point to multipoint (Single Cell Point to Multipoint, SC-PTM) mode. In the two modes, control information related to multicast service is transmitted in a broadcast mode over an air interface and data information is transmitted in a broadcast or multicast mode over an air interface. In a case of switching between multicast and unicast, a unicast connection has to be established from a core network to a radio access network (Radio Access Network, RAN), leading to a long delay.

For multicast services in new radio (New Radio, NR), a base station may transmit multicast service data to user equipment (User Equipment, UE) in a unicast mode or a multicast mode. However, in the prior art, there is no relevant solution on how to maintain continuity of a multicast service in a case that UE receiving multicast service data from a base station moves.

SUMMARY

Embodiments of the present disclosure provide a mobility management method, a source base station, a target base station, and a terminal device.

According to a first aspect of the present disclosure, a mobility management method performed by a source base station is provided. The method includes:
  receiving a report message from a terminal device, where the terminal device is a terminal device that receives data of a first multicast service, and the report message includes a measurement result; and
  transmitting a handover command to the terminal device, where the handover command is used to instruct the terminal device to switch to a target base station, and the target base station is determined based on the measurement result.

According to a second aspect of the present disclosure, a mobility management method performed by a target base station is provided. The method includes:
  receiving identifier information of a second multicast service from a source base station;
  transmitting air interface resource information to the source base station; and
  receiving an access complete message from a terminal device.

According to a third aspect of the present disclosure, a mobility management method performed by a terminal device is provided. The method includes:
  transmitting a report message to a source base station, where the report message includes a measurement result and identifier information of a fourth multicast service; and
  receiving a handover command from the source base station, where the handover command is used to instruct the terminal device to switch to a target base station.

According to a fourth aspect of the present disclosure, a source base station is provided. The source base station includes:
  a first receiving module, configured to receive a report message from a terminal device, where the terminal device is a terminal device that receives data of a first multicast service, and the report message includes a measurement result; and
  a first transmitting module, configured to transmit a handover command to the terminal device, where the handover command is used to instruct the terminal device to switch to a target base station, and the target base station is determined based on the measurement result.

According to a fifth aspect of the present disclosure, a target base station is provided. The target base station includes:
  a third receiving module, configured to receive identifier information of a second multicast service from a source base station;
  a fifth transmitting module, configured to transmit air interface resource information to the source base station; and
  a fourth receiving module, configured to receive an access complete message from a terminal device.

According to a sixth aspect of the present disclosure, a terminal device is provided. The terminal device includes:
  a tenth transmitting module, configured to transmit a report message to a source base station, where the report message includes a measurement result and identifier information of a fourth multicast service; and
  a sixth receiving module, configured to receive a handover command from the source base station, where the handover command is used to instruct the terminal device to switch to a target base station.

According to a seventh aspect of the present disclosure, a source base station is provided, which includes a processor, a memory, and a computer program stored in the memory and capable of running on the processor. When the computer program is executed by the processor, the steps of the mobility management method according to the first aspect are implemented.

According to an eighth aspect of the present disclosure, a target base station is provided, which includes a processor, a memory, and a computer program stored in the memory and capable of running on the processor. When the computer program is executed by the processor, the steps of the mobility management method according to the second aspect are implemented.

According to a ninth aspect of the present disclosure, a terminal device is provided, which includes a processor, a memory, and a computer program stored in the memory and capable of running on the processor. When the computer program is executed by the processor, the steps of the mobility management method according to the third aspect are implemented.

According to a tenth aspect of the present disclosure, a computer-readable storage medium is provided, where a computer program is stored in the computer-readable storage medium, and when the computer program is executed by a processor, the steps of the mobility management method according to the first aspect are implemented, or the steps of the mobility management method according to the second aspect are implemented, or the steps of the mobility management method according to the third aspect are implemented.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
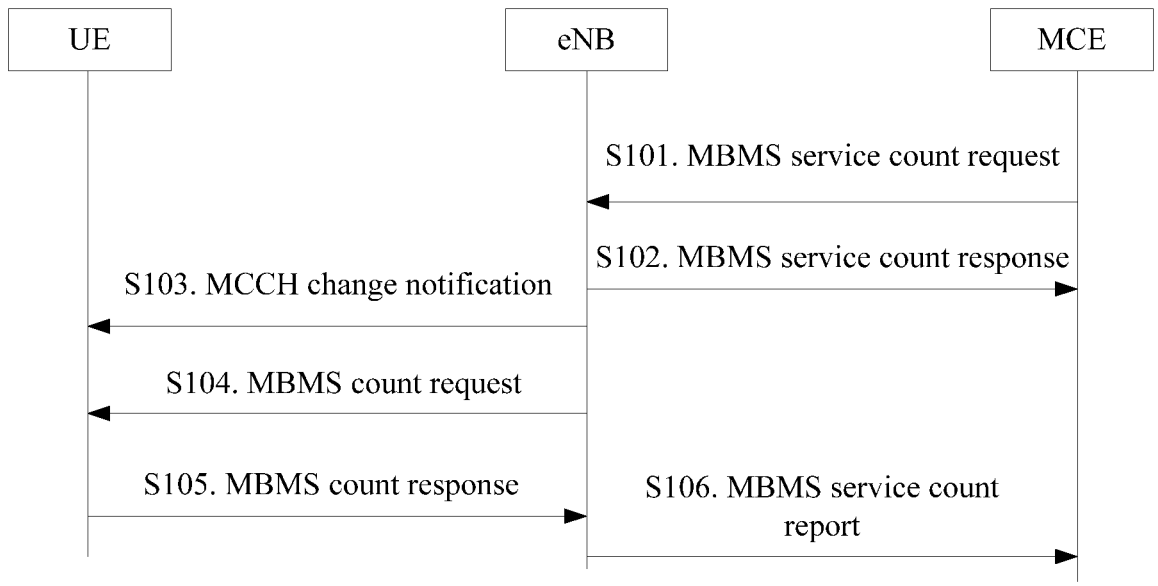
FIG. 1 is a flowchart of collecting statistics about an MBMS service user quantity according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C.

For ease of understanding, the following describes some content included in the embodiments of the present disclosure.

1. Multimedia Broadcast and Multicast Service (Multimedia Broadcast and Multicast Service, MBMS) or Multicast Broadcast Service (Multicast Broadcast Service, MBS):

In a long term evolution (Long Term Evolution, LTE) system, an MBMS service may be transmitted in the following two modes:

MBMS/MBS transmission mode 1: transmitted through a physical multicast channel (Physical Multicast Channel, PMCH) in an MBMS single frequency network (Multimedia Broadcast multicast service Single Frequency Network, MBSFN) subframe. Control information may be transmitted in system information (for example, SIB13) through a multicast control channel (Multicast Control Channel, MCCH), and data may be transmitted through a broadcast traffic channel (Multicast Traffic Channel, MTCH).

MBMS/MBS transmission mode 2: transmitted through a physical downlink shared channel (Physical Downlink Shared Channel, PDSCH) scheduled by a physical downlink control channel (Physical Downlink Control Channel, PDCCH). Control information may be transmitted in system information (for example, SIB20) through a single cell multicast control channel (Single Cell Multicast Control Channel, SC-MCCH), and data may be transmitted through a single cell broadcast traffic channel (Single Cell Multicast Traffic Channel, SC-MTCH). The SC-MCCH is transmitted by using a PDSCH scheduled by a PDCCH that corresponds to a single cell radio network temporary identity (Single Cell Radio Network Temporary Identity, SC-RNTI), and the SC-MTCH is transmitted by using a PDSCH scheduled by a PDCCH, which is identified by a group radio network temporary identity (Group Radio Network Temporary Identity, G-RNTI)

2. Counting Function in LTE:

In LTE, a multi-cell/multicast coordination entity (Multi-cell/Multicast Coordination Entity, MCE) triggers a radio access network (Radio Access Network, RAN) side to collect statistics about a subscriber quantity, and the MCE determines, based on a received statistical result, whether to use single cell point to multipoint (Single Cell Point to Multipoint, SC-PTM) (single-cell multicast) or MBSFN (multi-cell multicast). That is, the statistical result is not fed back to a core network node. A core network of a multicast service still maintains a multicast data tunnel, and only the RAN side determines, based on the statistical result, to transmit data received from the multicast data tunnel of the core network in a single-cell multicast or a multi-cell multicast mode.

Alternatively, statistics collection of the MBMS service user quantity may include the following steps, as shown in FIG. 1:

Step S101. The MCE transmits an MBMS service count request to an eNB.

Step S102. The eNB returns an MBMS service count response to the MCE.

Step S103. The eNB transmits an MCCH change notification to UE.

Step S104. The eNB transmits an MBMS count request to the UE.

Step S105. The UE returns an MBMS count response to the eNB.

Step S106. The eNB reports an MBMS service count to the MCE.

3. Handover:

Alternatively, a handover procedure may include the following steps:

Step S201. A UE context on a source base station contains information about roaming and access restrictions, and such information is provided when a connection is established or when a previous tracking area (Tracking Area, TA) is updated.

Step S202. The source base station configures a measurement procedure for UE, and the UE reports based on the measurement configuration.

Step S203. The source base station makes a decision on handover of the UE based on a measurement report (Measurement Report) and radio resource management (Radio Resource Management, RRM) information.

Step S204. The source base station transmits a handover request message to a target base station, where the handover request message carries information necessary for the target base station to prepare for handover.

Step S205. If slice information is transmitted to the target base station, the target base station performs slice-related access control, and if a protocol data unit (Protocol Data Unit, PDU) session is associated with a slice not supported, the target base station rejects such PDU session.

Step S206. The target base station transmits a handover request acknowledgment message to the source base station, where the handover request acknowledgment message includes a radio resource control (Radio Resource Control, RRC) message transmitted to the UE for performing handover.

Step S207. The source base station triggers Uu handover by transmitting an RRC reconfiguration (RRC Reconfiguration) message to the UE, where the message includes information required for accessing a target cell.

Step S208. The source base station transmits information related to a serial number (Serial Number, SN) state to the target base station.

Step S209. The UE is synchronized with the target cell, and transmits an RRC reconfiguration complete (RRC Reconfiguration Complete) message to the target base station for completing the RRC handover procedure.

Step S210. The target base station transmits a path switch request (Path Switch Request) message to an access and mobility management function (Access and Mobility Management Function, AMF) to trigger a 5th-generation core network (5th-Generation Core Network, 5GC) to switch a downlink (Down Link, DL) data path to the target base station.

Step S211. The 5GC switches the DL data path to the target base station. A user plane function (User Plane Function, UPF) transmits one or more end marker packets to the source base station on an old path of each PDU session or tunnel.

Step S212. The AMF transmits a path switch request acknowledgment (Path Switch Request Acknowledgement) message in response to the path switch request message.

Step S213. After receiving the path switch request acknowledgement message from the AMF, the target base station transmits a UE context release message to the source base station to inform the source base station of successful handover, and then the source base station may release resources associated with the UE context.

Figure 2:
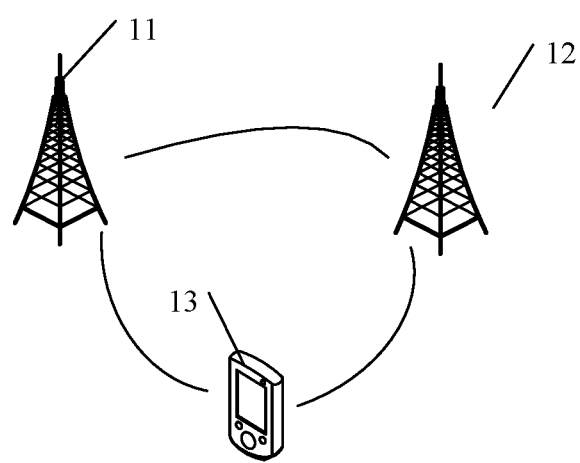
FIG. 2 is a structural diagram of a network system to which the embodiments of the present disclosure may be applied.

An embodiment of the present disclosure provides a mobility management method. Referring to FIG. 2, FIG. 2 is a structural diagram of a network system to which the embodiments of the present disclosure may be applied. As shown in FIG. 2, a source base station 11, a target base station 12, and a terminal device are included. The source base station 11 and the target base station 12 may each be a macro base station, an LTE eNB, a 5G NR NB, a gNB, or the like, or may be a small cell, for example, a low power node (Low Power Node, LPN), a pico cell, or a femto cell, or may be an access point (Access Point, AP), or may be a network node formed by a central unit (Central Unit, CU) and a plurality of TRPs managed and controlled by the central unit. It should be noted that the source base station 11 and the target base station 12 are not limited to a specific type in the embodiments of the present disclosure. The terminal device 13 may be a user side device such as a mobile phone, a tablet personal computer (Tablet Personal Computer), a laptop computer (Laptop Computer), a personal digital assistant (Personal Digital Assistant, PDA), a mobile Internet device (Mobile Internet Device, MID), or a wearable device (Wearable Device). It should be noted that the terminal device 13 is not limited to a specific type in the embodiments of the present disclosure.

Figure 3:
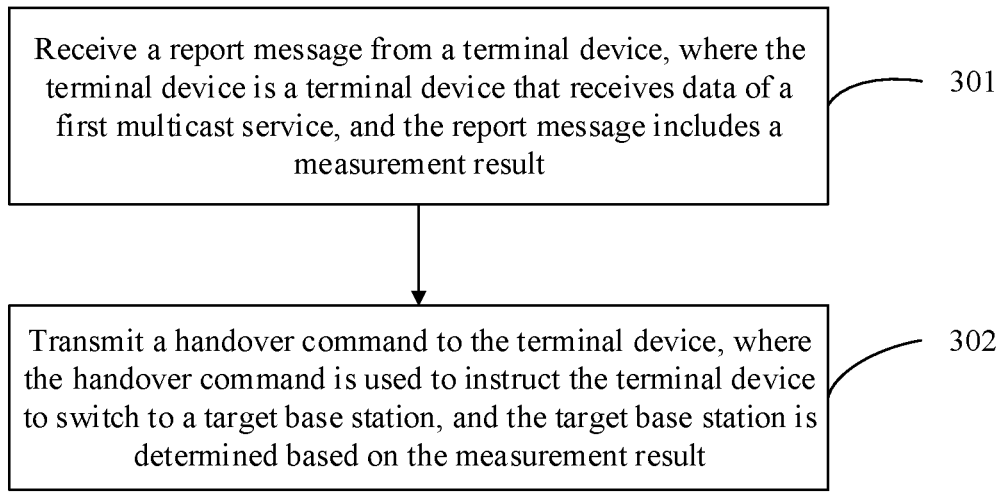
FIG. 3 is a flowchart of a mobility management method according to an embodiment of the present disclosure.

An embodiment of the present disclosure provides a mobility management method, applied to a source base station. Referring to FIG. 3, FIG. 3 is a flowchart of the mobility management method according to an embodiment of the present disclosure. As shown in FIG. 3, the method includes the following steps.

Step 301. Receive a report message from a terminal device, where the terminal device is a terminal device that receives data of a first multicast service, and the report message includes a measurement result.

In this embodiment, the first multicast service may include part or all of a multicast service received by the terminal device. The multicast service may include but is not limited to an MBMS service or MBS service.

Alternatively, the terminal device may receive a multicast service from the source base station in a unicast mode or multicast mode. The unicast mode may include a point to point (Point to Point, PTP) mode, and the multicast mode may include a point to multipoint (Point to Multipoint, PTM) mode.

Step 302. Transmit a handover command to the terminal device, where the handover command is used to instruct the terminal device to switch to a target base station, and the target base station is determined based on the measurement result.

In this embodiment, the target base station may be a base station selected based on only the measurement result, or may be a base station selected based on the measurement result and other parameters, for example, a base station selected based on the measurement result and part or all of at least one multicast service corresponding to the terminal device. The at least one multicast service corresponding to the terminal device may include a multicast service received by the terminal device and a multicast service that is expected but yet to be received by the terminal device (that is, a multicast service of interest to the terminal device).

In the embodiments of the present invention, a report message from a terminal device is received, where the terminal device is a terminal device that receives data of a first multicast service, and the report message includes a measurement result; and a handover command is transmitted to the terminal device, where the handover command is used to instruct the terminal device to switch to a target base station, so that the terminal device can be handed over to the target base station that supports part or all of a multicast service corresponding to the terminal device, thereby maintaining multicast service continuity during movement of UE, and reducing multicast service interruption caused by movement of the UE.

It should be noted that, in a case that the source base station has information about the target base station, the source base station may directly transmit the handover command to the terminal device to instruct the terminal device to switch to the target base station. The target base station can support part or all of at least one multicast service corresponding to the terminal device.

In the mobility management method provided in this embodiment of the present disclosure, a report message from a terminal device is received, where the terminal device is a terminal device that receives data of a first multicast service, and the report message includes a measurement result; and a handover command is transmitted to the terminal device, where the handover command is used to instruct the terminal device to switch to a target base station, so that the terminal device can be handed over to the target base station that supports part or all of a multicast service corresponding to the terminal device, thereby maintaining multicast service continuity during movement of UE, and reducing multicast service interruption caused by movement of the UE.

Optionally, the method may further include:
transmitting identifier information of a second multicast service to the target base station, where
the transmitting a handover command to the terminal device includes:
transmitting the handover command to the terminal device in a case that air interface resource information from the target base station has been received, where the handover command includes the air interface resource information.

In this embodiment, the second multicast service may be the same as the first multicast service, or may be different from the first multicast service, or may be partially the same as the first multicast service, which is not limited in this embodiment. For example, if first multicast services include a multicast service a1 to a multicast service a3, second multicast services may include the multicast service a1 to the multicast service a3, or may include the multicast service a3, or may include the multicast service a1 and a multicast service a4, or may include a multicast service a4, or the like.

Optionally, the identifier information of the second multicast service may be determined based on identifier information of the first multicast service, or may be determined based on identifier information of a fourth multicast service reported by the terminal device.

It should be noted that, in a case that the identifier information of the second multicast service is determined based on the identifier information of the first multicast service, the identifier information of the second multicast service may be the same as, partially the same as, or different from the identifier information of the first multicast service. Similarly, in a case that the identifier information of the second multicast service is determined based on the identifier information of the fourth multicast service reported by the terminal device, the identifier information of the second multicast service may also be the same as, partially the same as, or different from the identifier information of the fourth multicast service.

The identifier information of the second multicast service may be any information capable of identifying the second multicast service, for example, a temporary mobile group identity (Temporary Mobile Group Identity, TMGI).

The air interface resource may be an air interface resource used for transmitting a multicast service. The air interface resource may be an air interface resource reserved by the target base station for the multicast service, or may be an air interface resource being used by the target base station, which is not limited in this embodiment.

In practical application, the source base station transmits the identifier information of the second multicast service to the target base station, so that the target base station can learn, based on the identifier information of the second multicast service, that multicast service switch is being performed, and can allocate an air interface resource for the second multicast service. Correspondingly, if the source base station receives the air interface resource information from the target base station, it indicates that access to the target base station has been allowed and that the handover command can be transmitted to the terminal device to instruct the terminal device to switch to the target base station.

In this embodiment, a source base station transmits identifier information of a second multicast service to a target base station, so that the target base station can learn, based on the identifier information of the second multicast service, that multicast service switch is being performed, and can allocate an air interface resource for the second multicast service for transmitting data of the multicast service, thereby maintaining multicast service continuity during movement of UE, and reducing multicast service interruption caused by movement of the UE.

Optionally, the method may further include:
receiving forwarding tunnel information from the target base station; and
forwarding, through a first forwarding tunnel, multicast service data received from a first shared tunnel, where the first forwarding tunnel is a forwarding tunnel established based on the forwarding tunnel information, and the first shared tunnel is a tunnel between the source base station and a core network side device.

In this embodiment, the forwarding tunnel information is used for establishing a forwarding tunnel (Forwarding Tunnel) between the source base station and the target base station. For example, the forwarding tunnel information may include but is not limited to quality of service requirement information and resource configuration information.

Alternatively, in a case that the source base station has received the forwarding tunnel information from the target base station, the source base station may establish, based on the forwarding tunnel information, a forwarding tunnel, which is the first forwarding tunnel, and may directly forward the multicast service data received from the first shared tunnel to the target base station through the first forwarding tunnel. The first shared tunnel is a shared tunnel (Shared Tunnel) between the source base station and a core network side device.

In this embodiment, a source base station forwards multicast service data received from a first shared tunnel to a target base station through a first forwarding tunnel, so that less multicast service data is lost during movement of UE, thereby further maintaining multicast service continuity.

Optionally, the method further includes:
receiving identifier information of a third multicast service from the target base station; and
forwarding data of the third multicast service to the target base station.

In this embodiment, the third multicast service may be the same as, partially the same as, or different from the second multicast service. Optionally, third multicast services may include only a multicast service in multicast services supported by the target base station that is a second multicast service, or include all multicast services supported by the target base station.

For example, if second multicast services include a multicast service a1 to a multicast service a3, and the target base station supports the multicast service a1, the multicast service a2, and a multicast service a4, third multicast services may include only the multicast service a1 and the multicast service a2, or may include the multicast service a1, the multicast service a2, and the multicast service a4.

Optionally, the identifier information of the third multicast service may be determined based on the identifier information of the second multicast service. It should be noted that, in a case that the identifier information of the third multicast service is determined based on the identifier information of the second multicast service, the identifier information of the third multicast service may be the same as, partially the same as, or different from the identifier information of the second multicast service.

In this embodiment, a source base station may forward data of a multicast service supported by a target base station to the target base station, so that less multicast service data is lost and multicast service continuity is maintained.

Optionally, the method may further include at least one of the following:
transmitting a quality of service profile of the second multicast service to the target base station;
transmitting core network element information of the second multicast service to the target base station;
transmitting a quality of service flow identifier (QoS Flow ID, QFI) of the second multicast service to the target base station; or
prohibiting transmitting a user identity or device identity of the terminal device to the target base station.

In this embodiment, the quality of service profile (QoS profile) may include but is not limited to configuration information such as reliability and time delay. The core network element information may include a multicast/broadcast session management function ID (Multicast/Broadcast Session Management Function ID, MB-SMF ID), where the MB-SMF is used for managing multicast session services.

In this embodiment, the source base station further transmits at least one of the quality of service profile, QFI, and core network element information of the second multicast service to the target base station, so that the target base station can prepare for multicast service switch based on both the identifier information of the second multicast service and the at least one of the quality of service profile, QFI, and core network element information of the second multicast service.

It should be noted that, in this embodiment, the source base station does not or rejects transmitting a user identity or device identity of the terminal device to the target base station.

Optionally, the method may further include:
transmitting a forwarding tunnel release indication to the target base station, or receiving a forwarding tunnel release indication from the target base station, where the release indication is used to indicate stopping data forwarding or releasing resources of the forwarding tunnel.

In this embodiment, in a case that the source base station transmits the forwarding tunnel release indication to the target base station, or receives the forwarding tunnel release indication from the target base station, data forwarding may be stopped or resources of the forwarding tunnel may be released.

Optionally, the source base station may further transmit the forwarding tunnel release indication to the target base station via a core network side device, or receive the forwarding tunnel release indication from the target base station via the core network side device.

Optionally, the report message further includes identifier information of a fourth multicast service.

In this embodiment, the fourth multicast service may be the same as, partially the same as, or different from the first multicast service.

In this embodiment, the terminal device reports the identifier information of the fourth multicast service to the source base station, so that the source base station can determine the target base station based on the identifier information of the fourth multicast service and the measurement result that are reported by the terminal device.

Optionally, the target base station is determined based on the measurement result and the identifier information of the fourth multicast service.

In this embodiment, the source base station may determine the target base station based on the measurement result and the identifier information of the fourth multicast service. For example, a base station, of good quality, supporting part or all of the fourth multicast service may be selected as the target base station.

In this embodiment, a target base station is determined based on both a measurement result and identifier information of a second multicast service, thereby reducing multicast service interruption in a case that a multicast service is not supported by the target base station.

Optionally, the handover command includes identifier information of a fifth multicast service.

In this embodiment, the fifth multicast service may be the same as, partially the same as, or different from the third multicast service. Optionally, fifth multicast services may include only a multicast service in multicast services supported by the target base station that is a third multicast service, or include all multicast services supported by the target base station.

For example, if third multicast services include a multicast service a1 to a multicast service a3, and the target base station supports the multicast service a1, the multicast service a2, and a multicast service a4, fifth multicast services may include only the multicast service a1 and the multicast service a2, or may include the multicast service a1, the multicast service a2, and the multicast service a4.

Optionally, the identifier information of the fifth multicast service may be determined based on the identifier information of the third multicast service. It should be noted that, in a case that the identifier information of the fifth multicast service is determined based on the identifier information of the third multicast service, the identifier information of the fifth multicast service may be the same as, partially the same as, or different from the identifier information of the third multicast service.

Figure 4:
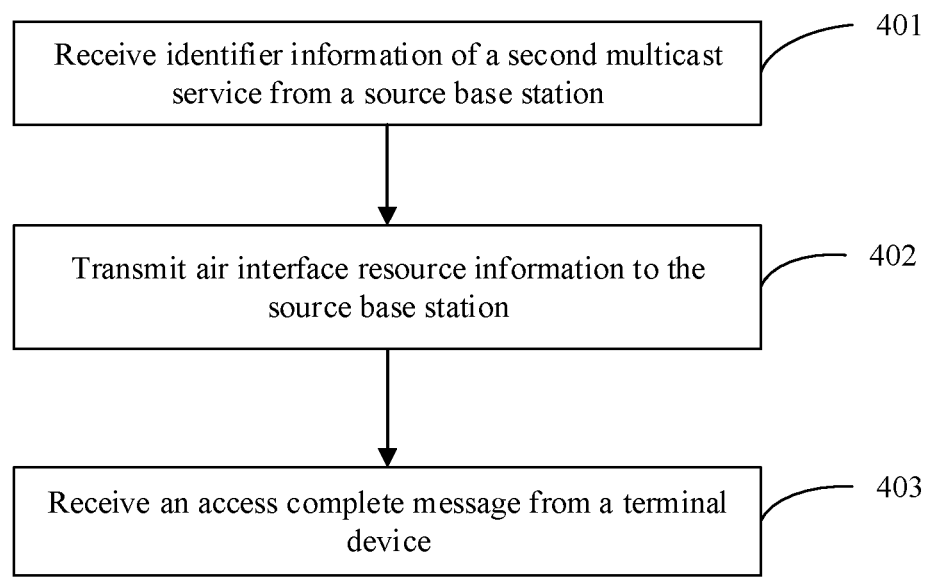
FIG. 4 is a flowchart of another mobility management method according to an embodiment of the present disclosure.

An embodiment of the present disclosure provides a mobility management method applied to a target base station. Referring to FIG. 4, FIG. 4 is a flowchart of another mobility management method according to an embodiment of the present disclosure. As shown in FIG. 4, the method includes the following steps.

Step 401. Receive identifier information of a second multicast service from a source base station.

In this embodiment, the multicast service may include but is not limited to an MBMS service or MBS service. The identifier information of the multicast service may be any information capable of identifying the multicast service, for example, a TMGI.

In practical application, the target base station receives the identifier information of the second multicast service from the source base station, so that the target base station can learn, based on the identifier information of the second multicast service, that multicast service switch is being performed.

Step 402. Transmit air interface resource information to the source base station.

In this embodiment, the air interface resource may be an air interface resource used for transmitting a multicast service. The air interface resource may be an air interface resource reserved by the target base station for the multicast service, or may be an air interface resource being used by the target base station, which is not limited in this embodiment.

For example, in a case that the target base station receives the identifier information of the second multicast service from the source base station, the target base station may reserve an air interface resource for the second multicast service and transmit the air interface resource information to the source base station.

Step 403. Receive an access complete message from a terminal device.

In this embodiment, if the target base station has received the access complete message from the terminal device, for example, an RRC reconfiguration complete (RRCReconfigurationComplete) message, it indicates that the terminal device has accessed the target base station, so that the target base station can deliver multicast service data to the terminal device over the air interface resource, so as to maintain multicast service continuity.

With the mobility management method provided in this embodiment of the present disclosure, identifier information of a second multicast service is received from a source base station; air interface resource information is transmitted to the source base station; and an access complete message is received from a terminal device. In this way, the target base station can deliver multicast service data to the terminal device over the air interface resource, so as to maintain multicast service continuity.

Optionally, after the receiving identifier information of a second multicast service from a source base station, the method further includes:

transmitting forwarding tunnel information to the source base station, where
a forwarding tunnel established based on the forwarding tunnel information is used to forward multicast service data received by the source base station.

In this embodiment, the forwarding tunnel information is used for establishing a forwarding tunnel (Forwarding Tunnel) between the source base station and the target base station. For example, the forwarding tunnel information may include but is not limited to quality of service requirement information and resource configuration information.

The forwarding tunnel established based on the forwarding tunnel information may be used for forwarding the multicast service data received by the source base station, for example, multicast service data received by the source base station from a first shared tunnel. The first shared tunnel is a shared tunnel (Shared Tunnel) between the source base station and a core network side device.

It should be noted that the multicast service data received by the source base station may include but is not limited to data of the second multicast service.

Optionally, after the receiving identifier information of a second multicast service from a source base station, the method further includes:

transmitting identifier information of a third multicast service to the source base station.

In this embodiment, the third multicast service may be the same as, partially the same as, or different from the second multicast service. Optionally, third multicast services may include only a multicast service in multicast services supported by the target base station that is a second multicast service, or include all multicast services supported by the target base station.

For example, if second multicast services include a multicast service a1 to a multicast service a3, and the target base station supports the multicast service a1, the multicast service a2, and a multicast service a4, third multicast services may include only the multicast service a1 and the multicast service a2, or may include the multicast service a1, the multicast service a2, and the multicast service a4.

Optionally, the identifier information of the third multicast service may be determined based on the identifier information of the second multicast service. It should be noted that, in a case that the identifier information of the third multicast service is determined based on the identifier information of the second multicast service, the identifier information of the third multicast service may be the same as, partially the same as, or different from the identifier information of the second multicast service.

Optionally, after the receiving identifier information of a second multicast service from a source base station, the method further includes:

transmitting identifier information of a sixth multicast service to a core network side device.

In this embodiment, the sixth multicast service may be the same as, partially the same as, or different from the second multicast service, or the sixth multicast service may be the same as, partially the same as, or different from the third multicast service. For example, sixth multicast services may include all multicast services supported by the target base station, or only a multicast service in multicast services supported by the target base station that is a second multicast service or a third multicast service.

Optionally, the identifier information of the sixth multicast service may be determined based on the identifier information of the second multicast service or the identifier information of the third multicast service. It should be noted that, in a case that the identifier information of the sixth multicast service is determined based on the identifier information of the second multicast service, the identifier information of the sixth multicast service may be the same as, partially the same as, or different from the identifier information of the second multicast service. Similarly, in a case that the identifier information of the sixth multicast service is determined based on the identifier information of the third multicast service, the identifier information of the sixth multicast service may be the same as, partially the same as, or different from the identifier information of the third multicast service.

Optionally, the method may further include:
transmitting shared tunnel information to the core network side device, where the shared tunnel information is used for establishing a shared tunnel between the target base station and the core network side device.

In this embodiment, the shared tunnel information is used for establishing a forwarding tunnel between the target base station and the core network side device. For example, the shared tunnel information may include but is not limited to quality of service requirement information and resource configuration information.

Alternatively, in a case that the core network side device has received the shared tunnel information from the target base station, the shared tunnel may be established based on the shared tunnel information and the identifier information of the sixth multicast service. The shared tunnel may be used by the core network side device to transmit data of the sixth multicast service to the target base station.

Optionally, the transmitting identifier information of a sixth multicast service to a core network side device includes one of the following:
in a case that the access complete message has been received from the terminal device, transmitting the identifier information of the sixth multicast service to the core network side device; and
in a case that the air interface resource information has been transmitted to the source base station, transmitting the identifier information of the sixth multicast service to the core network side device.

For example, the target base station may immediately transmit the identifier information of the sixth multicast service to the core network side device in a case that the target base station has received the access complete message from the terminal device or in a case that the target base station has transmitted the air interface resource information to the source base station.

Optionally, the method further includes at least one of the following:
receiving a quality of service profile of the second multicast service from the source base station;
receiving a quality of service flow identifier QFI of the second multicast service from the source base station; and
receiving core network element information of the second multicast service from the source base station and transmitting the core network element information to the core network side device.

In this embodiment, the quality of service profile (QoS profile) may include but is not limited to configuration information such as reliability and time delay. The core network element information may include an MB-SMF ID, where the MB-SMF is used for managing multicast session services.

In this embodiment, the target base station receives at least one of the quality of service profile, QFI, and core network element information of the second multicast service from the source base station, so as to prepare for multicast service switch based on both the identifier information of the second multicast service and the at least one of the quality of service profile, QFI, and core network element information of the second multicast service.

Optionally, the method further includes:
transmitting a forwarding tunnel release indication to the source base station, or receiving a forwarding tunnel release indication from the source base station, where the release indication is used to indicate stopping data forwarding or releasing resources of the forwarding tunnel.

In this embodiment, in a case that the target base station transmits the forwarding tunnel release indication to the source base station, or receives the forwarding tunnel release indication from the source base station, data forwarding may be stopped or resources of the forwarding tunnel may be released.

Optionally, the target base station may further transmit the forwarding tunnel release indication to the source base station via the core network side device, or receives the forwarding tunnel release indication that is transmitted by the source base station via the core network side device.

Optionally, after the receiving an access complete message from a terminal device, the method further includes:
instructing the terminal device to receive multicast service data in a point to multipoint PTM mode.

In this embodiment, after handover is completed, the terminal device may be instructed to receive the multicast service data in the PTM mode. The multicast service data may include but is not limited to data of a first multicast service. Alternatively, if the terminal device receives the multicast service data in a PTP mode before switch, the terminal device may switch from the PTP mode to the PTM mode to receive the multicast service data.

Figure 5:
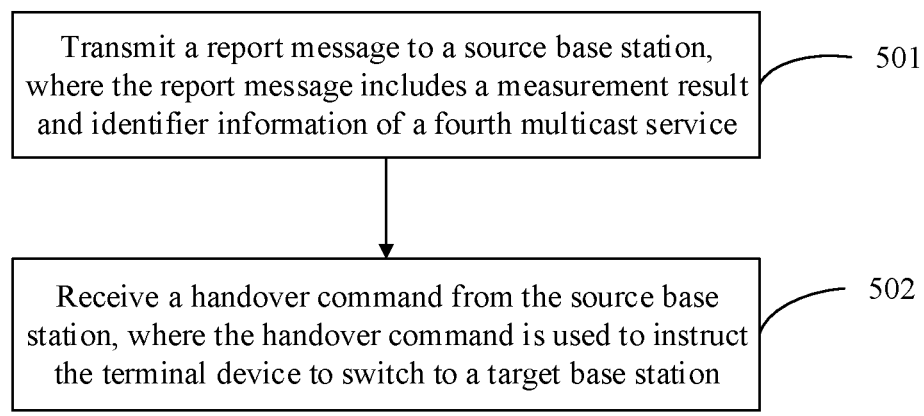
FIG. 5 is a flowchart of another mobility management method according to an embodiment of the present disclosure.

An embodiment of the present disclosure provides a mobility management method applied to a terminal device. Referring to FIG. 5, FIG. 5 is a flowchart of another mobility management method according to an embodiment of the present disclosure. As shown in FIG. 5, the method includes the following steps.

Step 501. Transmit a report message to a source base station, where the report message includes a measurement result and identifier information of a fourth multicast service.

In this embodiment, the terminal device may be a terminal device that receives a multicast service, and the fourth multicast service may be the same as, partially the same as, or different from the multicast service received by the terminal device.

Step 502. Receive a handover command from the source base station, where the handover command is used to instruct the terminal device to switch to a target base station.

In this embodiment, the target base station may be a base station selected only based on the measurement result, or may be a base station selected based on both the measurement result and the identifier information of the fourth multicast service. For example, a base station, of good quality, supporting part or all of the fourth multicast service may be selected as the target base station.

According to the mobility management method provided in this embodiment of the present disclosure, a report message is transmitted to a source base station, where the report message includes a measurement result and identifier information of a fourth multicast service; and a handover command is received from a source base station, where the handover command is used to instruct the terminal device to switch to the target base station. The measurement result and the identifier information of the fourth multicast service are reported to the source base station, so that the terminal device can be handed over to the target base station that supports part or all of a multicast service corresponding to the terminal device, thereby maintaining multicast service continuity during movement of UE, and reducing multicast service interruption caused by movement of the UE.

Optionally, the handover command may include at least one of the following:
 identifier information of a fifth multicast service; and
 air interface resource information of the target base station.

In this embodiment, the fifth multicast service may be the same as, partially the same as, or different from the third multicast service. Optionally, fifth multicast services may include only a multicast service in multicast services supported by the target base station that is a third multicast service, or include all multicast services supported by the target base station.

For example, if third multicast services include a multicast service a1 to a multicast service a3, and the target base station supports the multicast service a1, the multicast service a2, and a multicast service a4, fifth multicast services may include only the multicast service a1 and the multicast service a2, or may include the multicast service a1, the multicast service a2, and the multicast service a4.

Optionally, the identifier information of the fifth multicast service may be determined based on the identifier information of the third multicast service. It should be noted that, in a case that the identifier information of the fifth multicast service is determined based on the identifier information of the third multicast service, the identifier information of the fifth multicast service may be the same as, partially the same as, or different from the identifier information of the third multicast service.

The air interface resource may be an air interface resource used for transmitting a multicast service. The air interface resource may be an air interface resource reserved by the target base station for the multicast service, or may be an air interface resource being used by the target base station, which is not limited in this embodiment.

The following describes the embodiments of the present disclosure with reference to examples.

Example 1: A shared tunnel (Shared Tunnel) for a multicast service, that is, a user plane connection for the multicast service, has been established between a target base station and a core network, and all UE, under a coverage area of the target base station, expected to receive data of the multicast service can share the shared tunnel.

Figure 6:
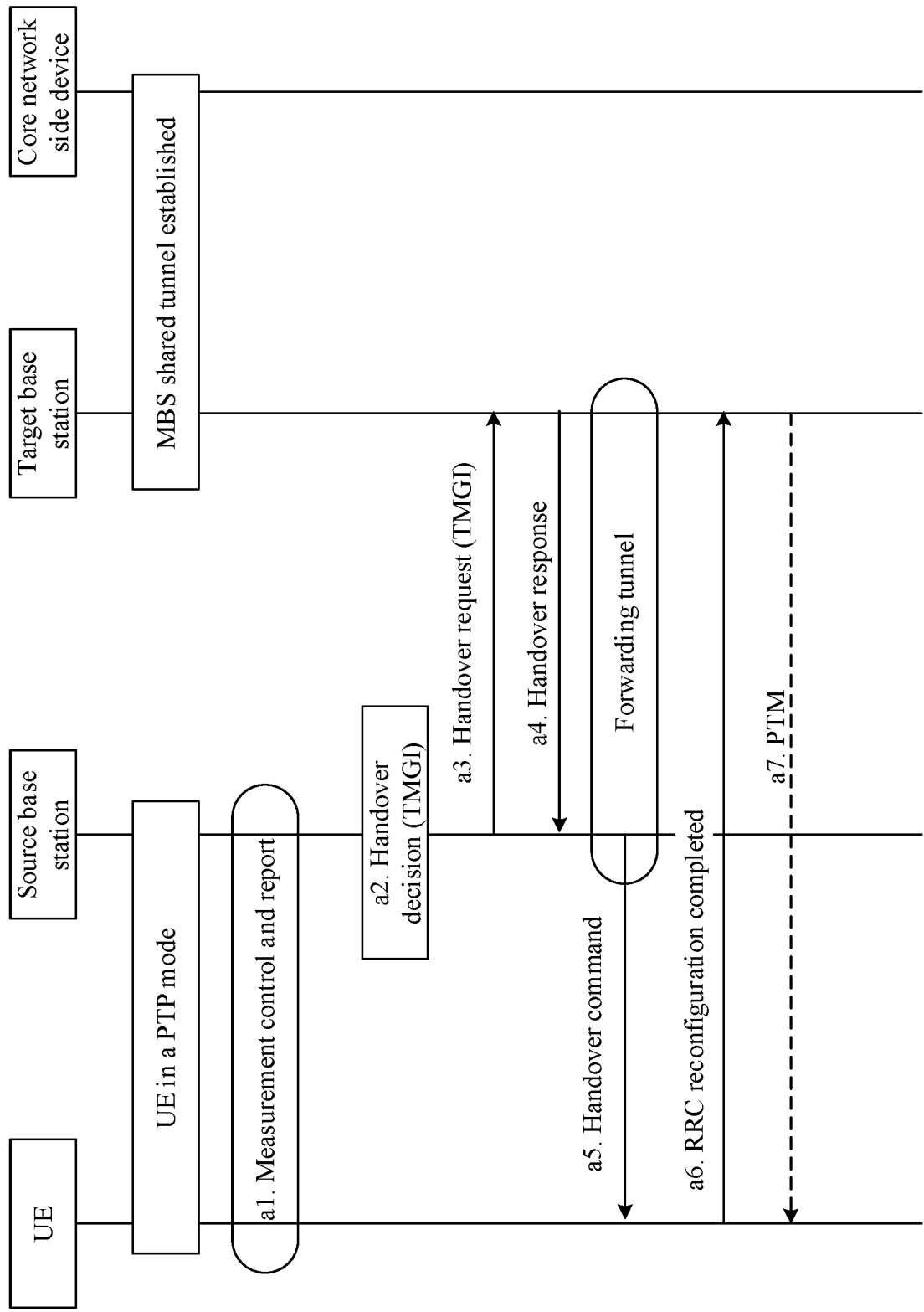
FIG. 6 is a flowchart of another mobility management method according to an embodiment of the present disclosure.

Referring to FIG. 6, UE receives data of the multicast service from a source base station in a PTP mode, and the multicast service may be an MBS service. Alternatively, the mobility management method provided in this embodiment of the present disclosure may include the following steps.

Step a1. The source base station performs measurement control (Measurement Control) on the UE, and the UE reports a measurement result to the source base station.

Step a2. Make a handover decision (Handover Decision).

In this step, after the source base station receives the measurement result reported by the UE, the handed-over-to target base station may be selected based on both the measurement result and a multicast service corresponding to the terminal device. For example, if the UE corresponds to three multicast services, the target base station that supports the three multicast services may be selected.

Step a3. The source base station transmits a handover request (Handover Request) message to the selected target base station.

The handover request message may carry all multicast service identifiers such as TMGIs corresponding to the UE, and quality of service profiles (QoS Profile) corresponding to the multicast service identifiers, so that the target base station can learn that PTP mode switch for multicast service is to be performed upon receiving this handover request message.

Step a4. The target base station transmits a handover response (Handover Response) message to the source base station.

Step a5. After receiving the handover response message, the source base station transmits a handover command to the UE, and may establish a forwarding tunnel (Forwarding Tunnel) between the source base station and the target base station.

Alternatively, the source base station may directly copy multicast service data received by the source base station from the shared tunnel to the forwarding tunnel. It should be noted that the source base station may release the forwarding tunnel after waiting for a period of time.

Step a6. The UE transmits an RRC reconfiguration complete message to the target base station.

Alternatively, the RRC reconfiguration complete message may also be referred to as a handover complete message or an access complete message. The UE transmits the RRC reconfiguration complete message to the target base station to inform the target base station that the UE has successfully accessed the target base station.

Step a7. The target base station changes a mode in which the UE receives the multicast service to a PTM mode.

Alternatively, after receiving the RRC reconfiguration complete message, the target base station may change the mode in which the UE receives the multicast service into the PTM mode. It should be noted that step a7 is optional.

Example 2: No shared tunnel (Shared Tunnel) for a multicast service, that is, a user plane connection for the multicast service, has been established between a target base station and a core network.

Figure 7:
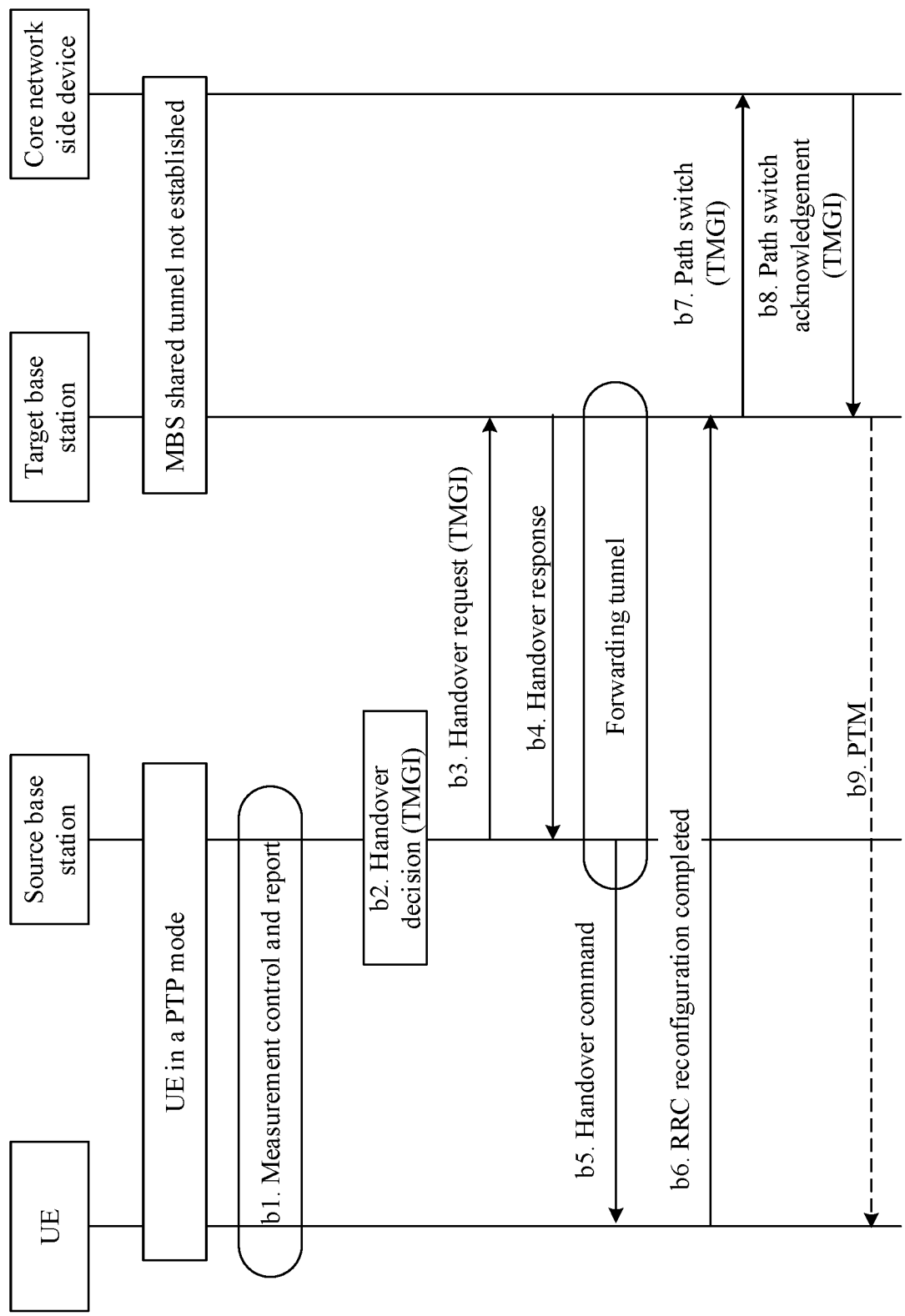
FIG. 7 is a flowchart of another mobility management method according to an embodiment of the present disclosure.

Referring to FIG. 7, UE receives data of the multicast service from a source base station in a PTP mode, and the multicast service may be an MBS service. Alternatively, the mobility management method provided in this embodiment of the present disclosure may include the following steps.

Step b1. The source base station performs measurement control (Measurement Control) on the UE, and the UE reports a measurement result to the source base station.

Step b2. Make a handover decision (Handover Decision).

In this step, after the source base station receives the measurement result reported by the UE, the handed-over-to target base station may be selected based on both the measurement result and a multicast service corresponding to the terminal device. For example, if the UE corresponds to three multicast services, the target base station that supports the three multicast services may be selected.

Step b3. The source base station transmits a handover request (Handover Request) message to the selected target base station.

The handover request message may carry all multicast service identifiers such as TMGIs corresponding to the UE, and quality of service profiles (QoS Profile) corresponding to the multicast service identifiers, so that the target base station can learn that PTP mode switch for multicast service is to be performed upon receiving this handover request message.

Step b4. The target base station transmits a handover response (Handover Response) message to the source base station.

Step b5. After receiving the handover response message, the source base station transmits a handover command to the UE, and may establish a forwarding tunnel (Forwarding Tunnel) between the source base station and the target base station.

Alternatively, the source base station may directly copy multicast service data received by the source base station from the shared tunnel to the forwarding tunnel. It should be noted that the source base station may release the forwarding tunnel after waiting for a period of time.

Step b6. The UE transmits an RRC reconfiguration complete message to the target base station.

Alternatively, the RRC reconfiguration complete message may also be referred to as a handover complete message or an access complete message. The UE transmits the RRC reconfiguration complete message to the target base station to inform the target base station that the UE has successfully accessed the target base station.

Step b7. The target base station transmits a path switch (Path Switch) message to the core network side device.

The path switch message carries a multicast service identifier. The target base station transmits the path switch message to the core network side device to request to establish a shared tunnel between the core network device and the target device for a multicast service corresponding to the multicast service identifier, that is, a user plane connection of the multicast service.

It should be noted that, after receiving the handover request message, the target base station may transmit the path switch (Path Switch) message to the core network side device. Optionally, the target base station may immediately transmit the path switch message to the core network side device in a case that the target base station has received the RRC reconfiguration complete message from the UE or in a case that the target base station has transmitted the handover response message to the source base station, which is not limited in this embodiment.

Step b8. After receiving the path switch message, the core network side device establishes a shared tunnel with the target base station for the multicast service and transmits a path switch acknowledgement (Path Switch Ack) message to the target base station.

Alternatively, upon receiving the path switch acknowledgement message, the target base station knows that the user plane connection has been established.

Step b9. The target base station may change a mode in which the UE receives the multicast service to a PTM mode.

Alternatively, after receiving the RRC reconfiguration complete message or after receiving the path switch acknowledgement message, the target base station may change the mode in which the UE receives the multicast service into the PTM mode. It should be noted that step b9 is optional.

In conclusion, for transmitting an MBS service by UE in a PTP mode, this embodiment of the present disclosure provides a solution for the UE to implement service continuity in a case that the UE changes from receiving a multicast service from a source base station in the PTP mode to receiving the multicast service from a target base station in the PTP mode.

Figure 8:
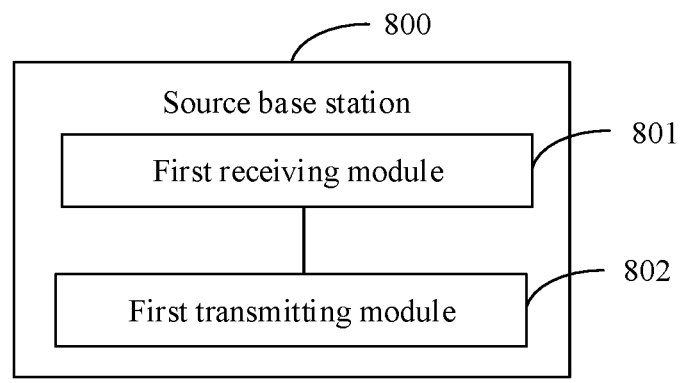
FIG. 8 is a structural diagram of a source base station according to an embodiment of the present disclosure.

Referring to FIG. 8, FIG. 8 is a structural diagram of a source base station according to an embodiment of the present disclosure. As shown in FIG. 8, the source base station 800 includes:

a first receiving module 801, configured to receive a report message from a terminal device, where the terminal device is a terminal device that receives data of a first multicast service, and the report message includes a measurement result; and a first transmitting module 802, configured to transmit a handover command to the terminal device, where the handover command is used to instruct the terminal device to switch to a target base station, and the target base station is determined based on the measurement result.

Optionally, the source base station further includes:

a second transmitting module, configured to transmit identifier information of a second multicast service to the target base station, where the first transmitting module is configured to:

transmit the handover command to the terminal device in a case that air interface resource information from the target base station has been received, where the handover command includes the air interface resource information.

Optionally, the source base station further configured to:

receive forwarding tunnel information from the target base station; and forward, through a first forwarding tunnel, multicast service data received from a first shared tunnel, where the first forwarding tunnel is a forwarding tunnel established based on the forwarding tunnel information, and the first shared tunnel is a tunnel between the source base station and a core network side device.

Optionally, the source base station further includes:

a second receiving module, configured to receive identifier information of a third multicast service from the target base station; and a third transmitting module, configured to forward data of the third multicast service to the target base station.

Optionally, the source base station further includes a fourth transmitting module, configured to perform at least one of the following:

transmitting a quality of service profile of the second multicast service to the target base station;

transmitting core network element information of the second multicast service to the target base station;

transmitting a quality of service flow identifier QFI of the second multicast service to the target base station; and prohibiting transmitting a user identity or device identity of the terminal device to the target base station.

Optionally, the source base station further includes:

a first transmitting module, configured to transmit a forwarding tunnel release indication to the target base station, or receive a forwarding tunnel release indication from the target base station, where the release indication is used to indicate stopping data forwarding or releasing resources of the forwarding tunnel.

Optionally, the report message further includes identifier information of a fourth multicast service.

Optionally, the target base station is determined based on the measurement result and the identifier information of the fourth multicast service.

Optionally, the handover command includes identifier information of a fifth multicast service.

The source base station 800 provided in this embodiment of the present disclosure can implement the processes implemented by the source base station in the foregoing method embodiment. To avoid repetition, details are not described herein again.

According to the source base station 800 in this embodiment of the present disclosure, the first receiving module 801 is configured to receive a report message from a terminal device, where the terminal device is a terminal device that receives data of a first multicast service, and the report message includes a measurement result; and the first transmitting module 802 is configured to transmit a handover command to the terminal device, where the handover command is used to instruct the terminal device to switch to a target base station, so that the terminal device can be handed over to the target base station that supports part or all of a multicast service corresponding to the terminal device, thereby maintaining multicast service continuity during movement of UE, and reducing multicast service interruption caused by movement of the UE.

Figure 9:
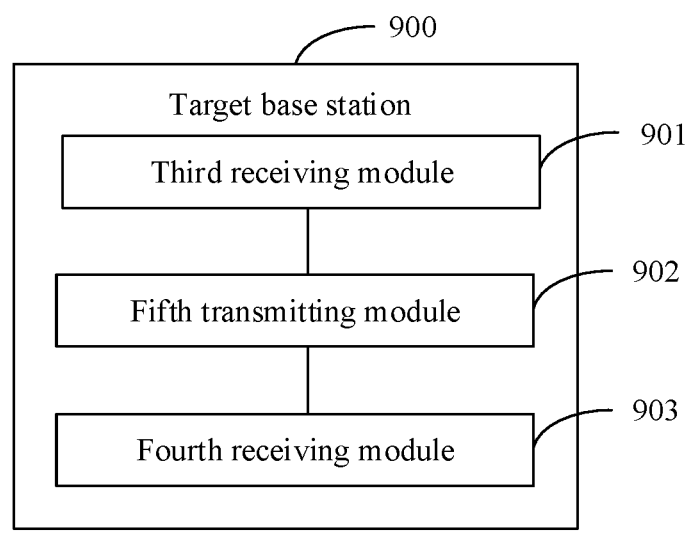
FIG. 9 is a structural diagram of a target base station according to an embodiment of the present disclosure.

Referring to FIG. 9, FIG. 9 is a structural diagram of a target base station according to an embodiment of the present disclosure. As shown in FIG. 9, the target base station 900 includes:

a third receiving module 901, configured to receive identifier information of a second multicast service from a source base station;

a fifth transmitting module 902, configured to transmit air interface resource information to the source base station; and a fourth receiving module 903, configured to receive an access complete message from a terminal device.

Optionally, the target base station further includes:

a sixth transmitting module, configured to transmit forwarding tunnel information to the source base station after the identifier information of the second multicast service has been received from the source base station, where a forwarding tunnel established based on the forwarding tunnel information is used to forward multicast service data received by the source base station.

Optionally, the target base station further includes:

a seventh transmitting module, configured to transmit identifier information of a third multicast service to the source base station after the identifier information of the second multicast service has been received from the source base station.

Optionally, the target base station further includes:

an eighth transmitting module, configured to transmit identifier information of a sixth multicast service to a core network side device after the identifier information of the second multicast service has been received from the source base station.

Optionally, the target base station further includes:

a ninth transmitting module, configured to transmit shared tunnel information to the core network side device, where the shared tunnel information is used for establishing a shared tunnel between the target base station and the core network side device.

Optionally, the eighth transmitting module is configured to perform one of the following:

in a case that the access complete message has been received from the terminal device, transmitting the identifier information of the sixth multicast service to the core network side device; and in a case that the air interface resource information has been transmitted to the source base station, transmitting the identifier information of the sixth multicast service to the core network side device.

Optionally, the target base station further includes a fifth receiving module, configured to perform at least one of the following:

receiving a quality of service profile of the second multicast service from the source base station;

receiving a quality of service flow identifier QFI of the second multicast service from the source base station; and receiving core network element information of the second multicast service from the source base station and transmitting the core network element information to the core network side device.

Optionally, the target base station further includes:

a second transmitting module, configured to transmit a forwarding tunnel release indication to the source base station, or receive a forwarding tunnel release indication from the source base station, where the release indication is used to indicate stopping data forwarding or releasing resources of the forwarding tunnel.

Optionally, the target base station further includes:

an instruction module, configured to: after the access complete message has been received from the terminal device, instruct the terminal device to receive multicast service data in a point to multipoint PTM mode.

The target base station 900 provided in this embodiment of the present disclosure can implement the processes implemented by the target base station in the foregoing method embodiment. To avoid repetition, details are not described herein again.

According to the target base station 900 in this embodiment of the present disclosure, the third receiving module 901 is configured to receive identifier information of a second multicast service from a source base station, the fifth transmitting module 902 is configured to transmit air interface resource information to the source base station, and the fourth receiving module 903 is configured to receive an access complete message from a terminal device. In this way, the target base station can deliver multicast service data to the terminal device over the air interface resource, so as to maintain multicast service continuity.

Figure 10:
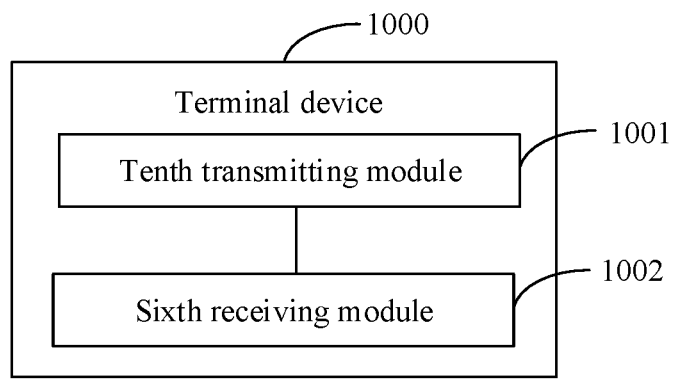
FIG. 10 is a structural diagram of a terminal device according to an embodiment of the present disclosure.

Referring to FIG. 10, FIG. 10 is a structural diagram of a terminal device according to an embodiment of the present disclosure. As shown in FIG. 10, the terminal device 1000 includes:

a tenth transmitting module 1001, configured to transmit a report message to a source base station, where the report message includes a measurement result and identifier information of a fourth multicast service; and a sixth receiving module 1002, configured to receive a handover command from the source base station, where the handover command is used to instruct the terminal device to switch to a target base station.

Optionally, the handover command includes at least one of the following:

identifier information of a fifth multicast service; and air interface resource information of the target base station.

The terminal device 1000 provided in this embodiment of the present disclosure can implement the processes implemented by the terminal device in the foregoing method embodiment. To avoid repetition, details are not described herein again.

According to the terminal device 100 in this embodiment of the present disclosure, the tenth transmitting module 1001 is configured to transmit a report message to a source base station, where the report message includes a measurement result and identifier information of a fourth multicast service; and the sixth receiving module 1002 is configured to receive a handover command from the source base station, where the handover command is used to instruct the terminal device to switch to a target base station. The measurement result and the identifier information of the fourth multicast service are reported to the source base station, so that the terminal device can be handed over to the target base station that supports part or all of a multicast service corresponding to the terminal device, thereby maintaining multicast service continuity during movement of UE, and reducing multicast service interruption caused by movement of the UE.

Figure 11:
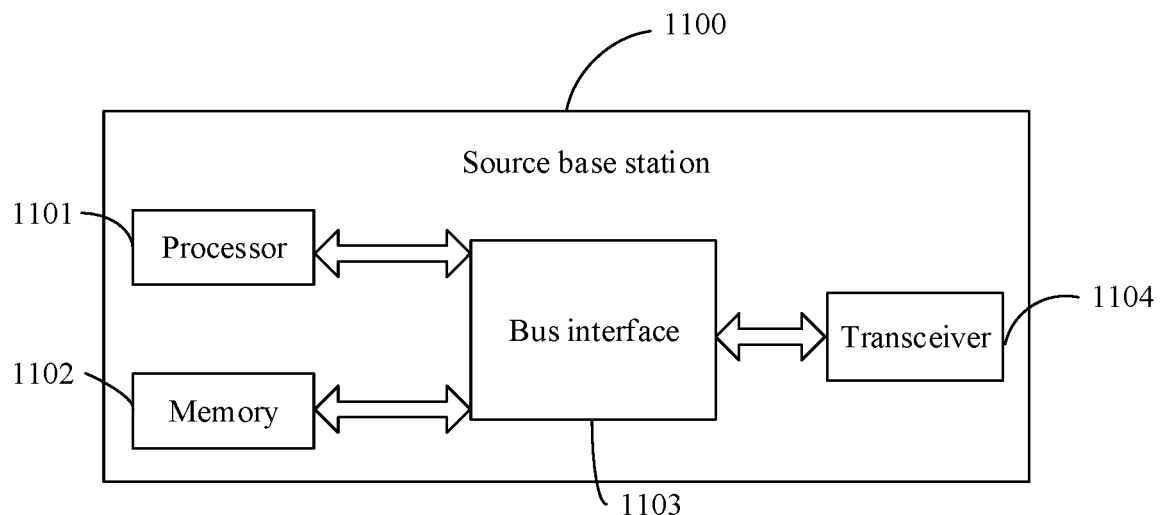
FIG. 11 is a structural diagram of another source base station according to an embodiment of the present disclosure.

Referring to FIG. 11, FIG. 11 is a structural diagram of another source base station according to an embodiment of the present disclosure. As shown in FIG. 11, the source base station 1100 includes a processor 1101, a memory 1102, a bus interface 1103, and a transceiver 1104, where the processor 1101, the memory 1102, and the transceiver 1104 are all connected to the bus interface 1103.

In this embodiment of the present disclosure, the source base station 1100 further includes a computer program stored in the memory 1102 and capable of running on the processor 1101.

In this embodiment of the present disclosure, the transceiver 1104 is configured to:
  receive a report message from a terminal device, where the terminal device is a terminal device that receives data of a first multicast service, and the report message includes a measurement result; and
  transmit a handover command to the terminal device, where the handover command is used to instruct the terminal device to switch to a target base station, and the target base station is determined based on the measurement result.

It should be understood that, in this embodiment of the present disclosure, the processor 1101 and the transceiver 1104 can implement the processes implemented by the source base station in the foregoing method embodiment. To avoid repetition, details are not described herein again.

Figure 12:
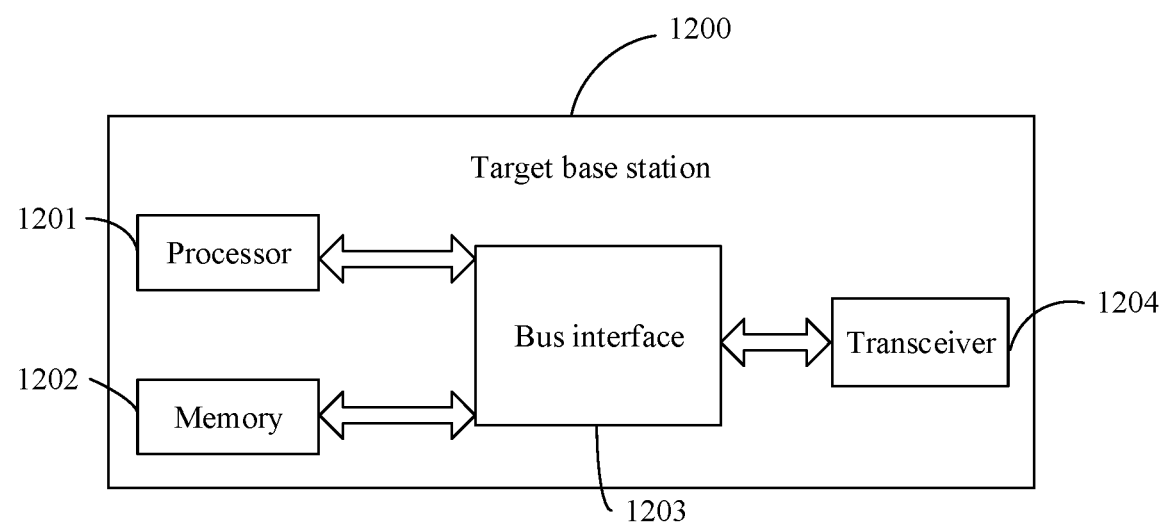
FIG. 12 is a structural diagram of another target base station according to an embodiment of the present disclosure.

Referring to FIG. 12, FIG. 12 is a structural diagram of another target base station according to an embodiment of the present disclosure. As shown in FIG. 12, the target base station 1200 includes a processor 1201, a memory 1202, a bus interface 1203, and a transceiver 1204, where the processor 1201, the memory 1202, and the transceiver 1204 are all connected to the bus interface 1203.

In this embodiment of the present disclosure, the target base station 1200 further includes a computer program stored in the memory 1202 and capable of running on the processor 1201.

In this embodiment of the present disclosure, the transceiver 1204 is configured to:
  receive identifier information of a second multicast service from a source base station;
  transmit air interface resource information to the source base station; and
  receive an access complete message from a terminal device.

It should be understood that, in this embodiment of the present disclosure, the processor 1201 and the transceiver 1204 can implement the processes implemented by the target base station in the foregoing method embodiment. To avoid repetition, details are not described herein again.

Figure 13:
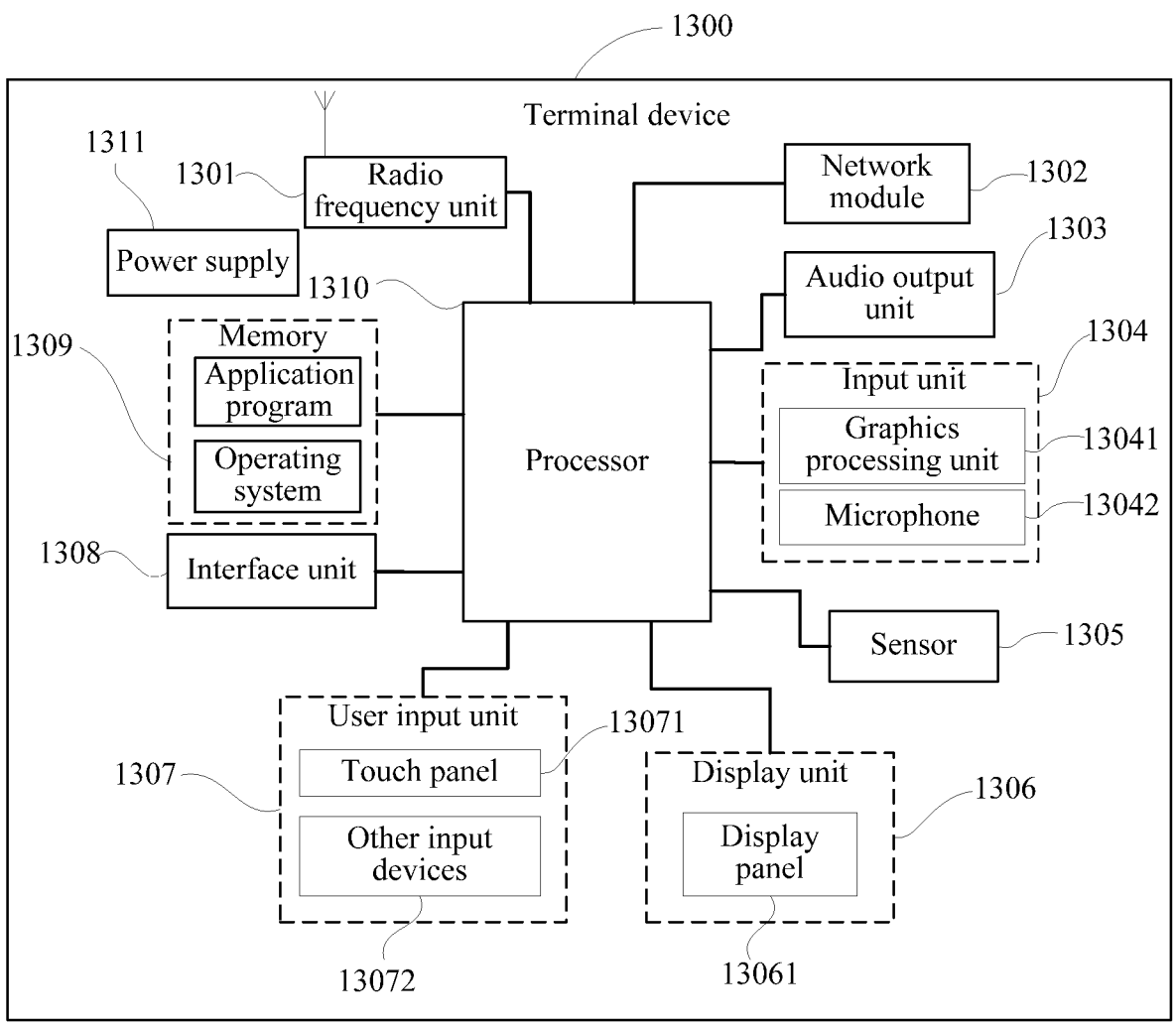
FIG. 13 is a structural diagram of another terminal device according to an embodiment of the present disclosure.

FIG. 13 is a structural diagram of another terminal device according to an embodiment of the present disclosure. Referring to FIG. 13, the terminal device 1300 include but is not limited to components such as a radio frequency unit 1301, a network module 1302, an audio output unit 1303, an input unit 1304, a sensor 1305, a display unit 1306, a user input unit 1307, an interface unit 1308, a memory 1309, a processor 1310, and a power supply 1311. A person skilled in the art may understand that the terminal device is not limited to the terminal device structure shown in FIG. 13. The terminal device may include more or fewer components than those shown in the figure, or combine some of the components, or arrange the components differently. In this embodiment of the present disclosure, the terminal device includes but is not limited to a mobile phone, a tablet computer, a notebook computer, a palmtop computer, a vehicle-mounted terminal, a wearable device, and a pedometer.

The radio frequency unit 1301 is configured to: transmit a report message to a source base station, where the report message includes a measurement result and identifier information of a fourth multicast service; and receive a handover command from the source base station, where the handover command is used to instruct the terminal device to switch to a target base station.

It should be understood that, in this embodiment of the present disclosure, the radio frequency unit 1301 and the processor 1310 can implement the processes implemented by the terminal device in the foregoing method embodiment. To avoid repetition, details are not described herein again.

It should be understood that, in this embodiment of the present disclosure, the radio frequency unit 1301 may be configured to receive and transmit signals in an information receiving/transmitting process or a call process; and alternatively, after receiving downlink data from a base station, transmit the downlink data to the processor 1310 for processing, and in addition, transmit uplink data to the base station. Generally, the radio frequency unit 1301 includes but is not limited to an antenna, at least one amplifier, a transceiver, a coupler, a low noise amplifier, and a duplexer. In addition, the radio frequency unit 1301 may further communicate with a network and other devices through a wireless communication system.

The terminal device provides wireless broadband internet access for a user by using the network module 1302, for example, helps the user send and receive e-mails, browse web pages, and access streaming media.

The audio output unit 1303 may convert audio data received by the radio frequency unit 1301 or the network module 1302 or stored in the memory 1309 into an audio signal and output the audio signal as a sound. Furthermore, the audio output unit 1303 may also provide audio output (for example, a call signal received sound or a message received sound) related to a specific function performed by the terminal device 1300. The audio output unit 1303 includes a speaker, a buzzer, a telephone receiver, and the like.

The input unit 1304 is configured to receive audio or video signals. The input unit 1304 may include a graphics processing unit (Graphics Processing Unit, GPU) 13041 and a microphone 13042. The graphics processing unit 13041 processes image data of a static picture or a video obtained by an image capture apparatus (for example, a camera) in an image capture mode or a video capture mode. A processed image frame may be displayed on the display unit 1306. The image frame processed by the graphics processing unit 13041 may be stored in the memory 1309 (or another storage medium) or transmitted via the radio frequency unit 1301 or the network module 1302. The microphone 13042 is capable of receiving sounds and processing such sounds into audio data. The processed audio data can be converted, in a telephone call mode, into a format that can be transmitted via the radio frequency unit 1301 to a mobile communication base station.

The terminal device 1300 further includes at least one sensor 1305, for example, an optical sensor, a motion sensor, and other sensors. Alternatively, the optical sensor includes an ambient light sensor and a proximity sensor. The ambient light sensor may adjust luminance of a display panel 13061 based on brightness of ambient light, and the proximity sensor may turn off the display panel 13061 and/or backlight when the terminal device 1300 moves close to an ear. As a type of motion sensor, an accelerometer sensor can detect magnitudes of accelerations in all directions (usually three axes), can detect a magnitude and a direction of gravity when the terminal device is in a static state, and can be applied to posture recognition (for example, landscape/portrait mode switching, related games, or magnetometer posture calibration) of the terminal device, functions related to vibration recognition (for example, a pedometer and tapping), and the like. The sensor 1305 may also include a fingerprint sensor, a pressure sensor, an iris sensor, a molecular sensor, a gyroscope, a barometer, a hygrometer, a thermometer, an infrared sensor, and the like. Details are not described herein.

The display unit 1306 is configured to display information input by the user or information provided to the user. The display unit 1306 may include the display panel 13061, and the display panel 13061 may be configured in a form of a liquid crystal display (Liquid Crystal Display, LCD), an organic light-emitting diode (Organic Light-Emitting Diode, OLED), or the like.

The user input unit 1307 may be configured to: receive a digit or character that is input, and generate key signal input related to user settings and function control of the terminal device. Alternatively, the user input unit 1307 includes a touch panel 13071 and other input devices 13072. The touch panel 13071 is also referred to as a touchscreen and can capture a touch operation performed by a user on or near the touch panel (for example, an operation performed by the user on the touch panel 13071 or near the touch panel 13071 by using any appropriate object or accessory such as a finger or a stylus). The touch panel 13071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, transmits the touchpoint coordinates to the processor 1310, and can receive a command transmitted by the processor 1310 and execute the command. In addition, the touch panel 13071 may be implemented in a plurality of forms, for example, as a resistive, capacitive, infrared, or surface acoustic wave touch panel. The user input unit 1307 may further include other input devices 13072 in addition to the touch panel 13071. Alternatively, the other input devices 13072 may include but are not limited to a physical keyboard, a function button (for example, a volume button or a power button), a trackball, a mouse, and a joystick. Details are not described herein.

Further, the touch panel 13071 may cover the display panel 13061. When detecting a touch operation on or near the touch panel 13071, the touch panel 13071 transmits the touch operation to the processor 1310 to determine a type of a touch event. Then, the processor 1310 provides a corresponding visual output on the display panel 13061 based on the type of the touch event. Although in FIG. 13, the touch panel 13071 and the display panel 13061 act as two separate components to implement input and output functions of the terminal device, in some embodiments, the touch panel 13071 and the display panel 13061 may be integrated to implement the input and output functions of the terminal device. This is not limited herein.

The interface unit 1308 is an interface for connecting an external apparatus to the terminal device 1300. For example, the external apparatus may include a wired or wireless headphone port, an external power (or battery charger) port, a wired or wireless data port, a memory card port, a port for connecting an apparatus with an identification module, an audio input/output (I/O) port, a video I/O port, an earphone port, and the like. The interface unit 1308 may be configured to: receive input (for example, data information and electric power) from the external apparatus, and transmit the received input to one or more elements in the terminal device 1300; or may be configured to transmit data between the terminal device 1300 and the external apparatus.

The memory 1309 may be configured to store software programs and various data. The memory 1309 may mainly include a program storage area and a data storage area. The program storage area may store an operating system, an application program required for at least one function (for example, a sound play function and an image play function), and the like. The data storage area may store data created based on usage of the mobile phone (for example, audio data and contacts), and the like. In addition, the memory 1309 may include a high-speed random access memory, and may further include a non-volatile memory such as at least one disk storage device, a flash memory device, or another volatile solid-state storage device.

The processor 1310 is a control center of the terminal device, uses various interfaces and lines to connect all parts of the entire terminal device, and performs various functions and data processing of the terminal device by running or executing software programs and/or modules stored in the memory 1309 and invoking data stored in the memory 1309, so as to perform overall monitoring on the terminal device. The processor 1310 may include one or more processing units. Preferably, the processor 1310 may integrate an application processor and a modem processor. The application processor mainly processes an operating system, a user interface, an application program, and the like. The modem processor mainly processes wireless communication. It can be understood that the modem processor may alternatively not be integrated in the processor 1310.

The terminal device 1300 may further include the power supply 1311 (for example, a battery) that supplies power to the components. Preferably, the power supply 1311 may be logically connected to the processor 1310 via a power management system. In this way, functions such as charge management, discharge management, and power consumption management are implemented by using the power management system.

In addition, the terminal device 1300 includes some functional modules that are not shown, details of which are not described herein.

Preferably, an embodiment of the present disclosure further provides a terminal device, including a processor 1310, a memory 1309, and a computer program stored in the memory 1309 and capable of running on the processor 1310. When the computer program is executed by the processor 1310, the processes in the foregoing embodiments of the mobility management method are implemented, with the same technical effects achieved. To avoid repetition, details are not described herein again.

An embodiment of the present disclosure further provides a computer-readable storage medium, where a computer program is stored in the computer-readable storage medium.

When the computer program is executed by a processor, the processes in the foregoing embodiments of the mobility management method are implemented, with the same technical effects achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing embodiments. The foregoing embodiments are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A mobility management method performed by a source base station, comprising:
   receiving a report message from a terminal device, wherein the terminal device is a terminal device that receives data of a first multicast service, and the report message comprises a measurement result; and
   transmitting a handover command to the terminal device, wherein the handover command is used to instruct the terminal device to switch to a target base station, and the target base station is determined based on the measurement result;
   wherein the method further comprises:
   receiving forwarding tunnel information from the target base station; and
   forwarding, through a first forwarding tunnel, multicast service data received from a first shared tunnel, wherein the first forwarding tunnel is a forwarding tunnel established based on the forwarding tunnel information, and the first shared tunnel is a tunnel between the source base station and a core network side device.

2. The method according to claim 1, further comprising:
   transmitting identifier information of a second multicast service to the target base station, wherein
   the transmitting a handover command to the terminal device comprises:
   transmitting the handover command to the terminal device in a case that air interface resource information from the target base station has been received, wherein the handover command comprises the air interface resource information.

3. The method according to claim 2, further comprising:
   receiving identifier information of a third multicast service from the target base station; and
   forwarding data of the third multicast service to the target base station.

4. The method according to claim 2, wherein the method further comprises at least one of the following:
   transmitting a quality of service profile of the second multicast service to the target base station;
   transmitting core network element information of the second multicast service to the target base station;
   transmitting a quality of service flow identifier (QFI) of the second multicast service to the target base station; or
   prohibiting transmitting a user identity or device identity of the terminal device to the target base station.

5. The method according to claim 1, further comprising:
   transmitting a forwarding tunnel release indication to the target base station, or receiving a forwarding tunnel release indication from the target base station, where the release indication is used to indicate stopping data forwarding or releasing resources of the forwarding tunnel.

6. The method according to claim 1, wherein the report message further comprises identifier information of a fourth multicast service,
   wherein the target base station is determined based on the measurement result and the identifier information of the fourth multicast service, or
   wherein the handover command comprises identifier information of a fifth multicast service.

7. A source base station, comprising:
   a processor; and
   a memory storing a computer program that is capable of running on the processor, wherein the computer program, when executed by the processor, causes the source bases station to perform the steps of the mobility management method according to claim 1.

8. A mobility management method performed by a target base station and comprising:
   receiving identifier information of a second multicast service from a source base station;
   transmitting air interface resource information to the source base station; and
   receiving an access complete message from a terminal device;
   wherein after the receiving identifier information of a second multicast service from a source base station, the method further comprises:
   transmitting forwarding tunnel information to the source base station, wherein a forwarding tunnel established based on the forwarding tunnel information is used to forward multicast service data received by the source base station;
   wherein after the receiving identifier information of a second multicast service from a source base station, the method further comprises:

transmitting identifier information of a sixth multicast service to a core network side device.

9. The method according to claim 8, wherein after the receiving identifier information of a second multicast service from a source base station, the method further comprises:
transmitting identifier information of a third multicast service to the source base station.

10. The method according to claim 8, further comprising:
transmitting shared tunnel information to the core network side device, wherein the shared tunnel information is used for establishing a shared tunnel between the target base station and the core network side device.

11. The method according to claim 8, wherein the transmitting identifier information of a sixth multicast service to a core network side device comprises one of the following:
in a case that the access complete message has been received from the terminal device, transmitting the identifier information of the sixth multicast service to the core network side device; and
in a case that the air interface resource information has been transmitted to the source base station, transmitting the identifier information of the sixth multicast service to the core network side device.

12. The method according to claim 8, wherein the method further comprises at least one of the following:
receiving a quality of service profile of the second multicast service from the source base station;
receiving a quality of service flow identifier (QFI) of the second multicast service from the source base station; or
receiving core network element information of the second multicast service from the source base station and transmitting the core network element information to a core network side device.

13. The method according to claim 8, further comprising:
transmitting a forwarding tunnel release indication to the source base station, or receiving a forwarding tunnel release indication from the source base station, where the release indication is used to indicate stopping data forwarding or releasing resources of the forwarding tunnel.

14. The method according to claim 8, wherein after the receiving an access complete message from a terminal device, the method further comprises:
instructing the terminal device to receive multicast service data in a point to multipoint (PTM) mode.

15. A target base station, comprising:
a processor; and
a memory storing a computer program that is capable of running on the processor, wherein the computer program, when executed by the processor, causes the target base station to perform the steps of the mobility management method according to claim 8.

* * * * *